United States Patent
Sindhwani et al.

(10) Patent No.: US 7,496,360 B2
(45) Date of Patent: Feb. 24, 2009

(54) MULTI-FUNCTION TELEPHONE

(75) Inventors: Manoj Sindhwani, Oakhill, VA (US); Thomas F. Flanagan, Springfield, VA (US)

(73) Assignee: Texas Instruments Incorporated, Dallas, TX (US)

( * ) Notice: Subject to any disclaimer, the term of this patent is extended or adjusted under 35 U.S.C. 154(b) by 1141 days.

(21) Appl. No.: 10/789,036

(22) Filed: Feb. 27, 2004

(65) Prior Publication Data
US 2005/0190747 A1 Sep. 1, 2005

(51) Int. Cl.
*H04Q 7/20* (2006.01)

(52) U.S. Cl. ............... 455/422.1; 455/414.1; 455/417; 455/418; 455/425; 455/426.1; 455/426.2; 455/41.2; 455/41.3; 455/435.1; 455/435.2; 455/436; 455/443; 455/450; 370/310; 370/310.2; 370/322; 370/328; 370/331; 370/338; 370/341; 379/93.35; 379/142.08; 379/215.01

(58) Field of Classification Search ............... 455/41.2, 455/41.3, 422.1, 414.1, 417, 418, 425, 426.2, 455/335.1, 0.2, 436, 443, 450; 370/310, 370/310.2, 322, 328, 331, 338, 341; 379/93.35, 379/142.08, 215.01
See application file for complete search history.

(56) References Cited

U.S. PATENT DOCUMENTS

| | | | | |
|---|---|---|---|---|
| 5,475,735 A | * | 12/1995 | Williams et al. ............ | 455/403 |
| 5,995,843 A | * | 11/1999 | Sjodin et al. ................ | 455/462 |
| 6,212,395 B1 | * | 4/2001 | Lu et al. ..................... | 455/463 |
| 6,526,277 B1 | * | 2/2003 | Zicker et al. ............ | 455/426.2 |
| 6,661,785 B1 | * | 12/2003 | Zhang et al. ................ | 370/352 |
| 6,694,134 B1 | * | 2/2004 | Lu et al. ..................... | 455/419 |
| 6,768,726 B2 | * | 7/2004 | Dorenbosch et al. ........ | 370/331 |
| 6,829,480 B1 | * | 12/2004 | Hoglund et al. ............ | 455/433 |
| 6,853,851 B1 | * | 2/2005 | Rautiola et al. .......... | 455/553.1 |
| 6,879,574 B2 | * | 4/2005 | Naghian et al. ............ | 370/338 |
| 6,931,249 B2 | * | 8/2005 | Fors et al. .................... | 455/436 |
| 7,009,952 B1 | * | 3/2006 | Razavilar et al. ............ | 370/331 |
| 7,133,677 B2 | * | 11/2006 | Feder et al. ................ | 455/443 |
| 7,209,766 B2 | * | 4/2007 | Zanaty ..................... | 455/552.1 |
| 7,224,677 B2 | * | 5/2007 | Krishnamurthi et al. .... | 370/331 |
| 7,251,488 B2 | * | 7/2007 | Chitrapu .................... | 455/436 |
| 2001/0025280 A1 | * | 9/2001 | Mandato et al. ................ | 707/3 |
| 2003/0117978 A1 | * | 6/2003 | Haddad ..................... | 370/331 |
| 2004/0043788 A1 | * | 3/2004 | Mittal ........................ | 455/558 |
| 2004/0072593 A1 | * | 4/2004 | Robbins et al. ............. | 455/560 |
| 2004/0081117 A1 | * | 4/2004 | Malek et al. ................ | 370/324 |
| 2004/0121772 A1 | * | 6/2004 | Rue ............................ | 455/436 |

* cited by examiner

*Primary Examiner*—Stephen M D'Agosta
(74) *Attorney, Agent, or Firm*—Steven A. Shaw; W. James Brady; Frederick J. Telecky, Jr.

(57) ABSTRACT

A wireless mobile telephone for connecting to multiple networks that includes a cellular module for routing calls through a cellular telephone network, a wireless network module, operably connected to the cellular module, for routing calls on a wireless local area network (WLAN). The mobile telephone provides simultaneous connectivity to a cellular network and a WLAN and automatically detects and configures the mobile telephone to the WLAN when the mobile telephone enters a WLAN broadcast area using preprogrammed operating profiles for each different WLAN.

16 Claims, 7 Drawing Sheets

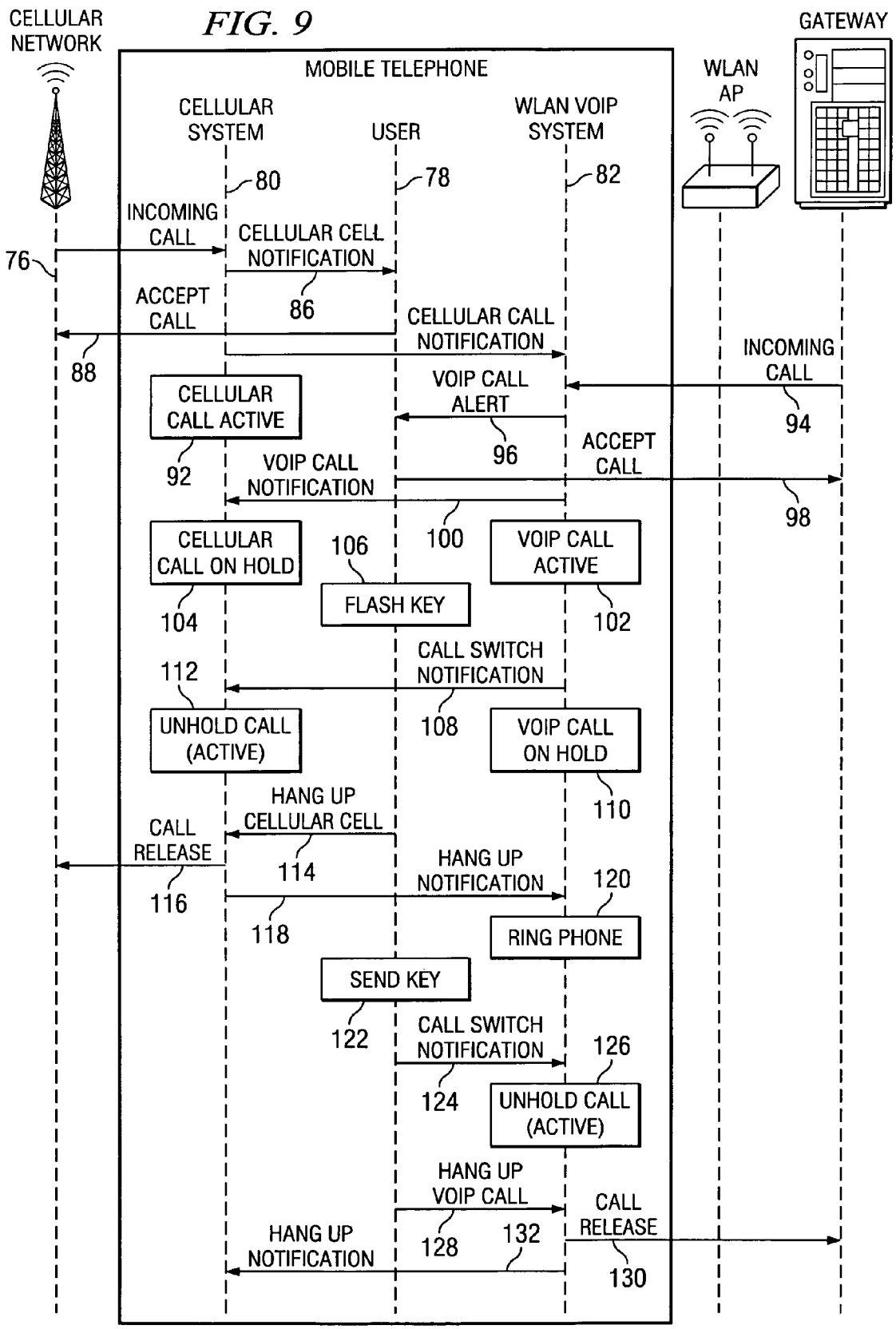

MULTI-FUNCTION TELEPHONE

CROSS-REFERENCE TO RELATED APPLICATIONS

None

FIELD OF THE INVENTION

The present invention relates generally to a mobile telephone that supports multiple protocols over multiple telephony and data networks.

BACKGROUND OF THE INVENTION

The family of wireless, or mobile, telephones include cellular telephones, wireless office phones, cordless telephones, and Internet Protocol (IP) phones.

The traditional wireless telephone used in many homes is a cordless telephone. Cordless telephones transmit and receive radio signals from a base station that is connected directly to a publicly switched telephone network (PSTN) line. Cordless telephones can send and receive radio signals with analog or digital frequency modulation protocols. Modern cordless telephones have the capabilities of switching frequencies automatically to avoid interference with other cordless phones and to avoid interference caused by electronic devices such as computers. Cordless telephone systems have a range of radio signal transmission typically in the hundreds of feet from a base station.

Cellular networks were initially installed with analog transmissions using AMPS protocols. Modern cellular networks have developed into digital formats using protocols such as global services for mobile communications (GSM) and code division multiple access (CDMA). FIG. 1 illustrates a schematic diagram of a cellular telephone network 10. A base transceiver station (BTS) 12 may broadcast radio frequency (RF) signals 14 towards a general area or in all surrounding areas of the BTS, which is represented by area 16 in the schematic. Cellular telephone network systems utilize wireless communication channels 18, or paths, between a mobile telephone 20 and a radio antennae on a base station tower 12. Cellular transmission antennas are commonly placed on a base station tower 12 or high-rise structures to support a regional or nationwide cellular network. Packetized voice data (voice packets) 18 are transferred to the PSTN. A BTS 12 may have a maximum RF signal 15 transmission distance ranging from approximately five to ten miles or more from a transmission 12, which varies depending upon numerous factors including interference with structures, topography, or foliage, transmitting power, and signal attenuation. By placing multiple transmitters in the cellular network, telephone calls may be seamlessly passed from one transmitting tower to another through a "handoff" procedure.

A land-based type of local telephone system used by businesses, hospitals, and schools is called a private branch exchange (PBX). A PBX is private telephone system switch that serves a digital or analog telephone network within a specific location, such as an office building or campus. A PBX can route telephone calls within the PBX network. PBX switches also route calls externally to the PSTN. Each on-site telephone is wired to the PBX switch instead of an external PSTN line. The advantage of a PBX system is that numerous telephones can share far fewer PSTN trunk lines to place and receive external calls.

A wireless PBX network uses unlicenced frequencies and has the capability of internal dialing from one wireless telephone directly to other wireless telephones on the network as well as dialing out to the PSTN. Wireless PBX telephone handsets must be custom manufactured to incorporate unique features of a particular PBX system and are therefore not widely used. Wireless PBX phones require base stations with broadcasting and receiving antennas placed throughout an office building and in outdoor areas between buildings. The base stations are wired to specialized hardware and software within a PBX system.

Similar to roaming features on a cellular network, calls on a wireless PBX system are transferred between base stations/access points (APs) when the mobile handset is moved out of range of a current base station/AP and towards a base station/AP with a stronger signal. Handsets for wireless PBX systems have an upper range transmission range of approximately 150 feet, depending upon interferences.

An additional wireless phone system is the Digital Enhanced Cordless Telecommunications (DECT) phone. DECT is a standard for international digital radio access for cordless telephones. It is based on TDMA (time division multiple access) protocols and offers heightened security and low interference. The signal range for a DECT phone is approximately 50 to 300 meters, depending upon interferences. A DECT phone can operate using a base station in a home or office or from a network of several base stations. For example, a DECT phone can act as a PBX extension within an office. DECT handsets can communicate with other DECT phones through the base station. DECT technology has been combined with GSM to create a dual mobile handset where calls to a phone can be routed through either the DECT base station or through a mobile GSM network.

Telephone handsets can be integrated into local area networks that have network entities like proxy servers, media gateway controllers (MGC), media access gateways, or gatekeepers to route calls from the handset through a gateway using packet telephony under voice over Internet Protocols (VoIP). A media access gateway works in coordination with an MGC to connect the physical links of the LAN to external networks, including the PSTN, and for controlling media stream conversions between protocols of different systems as required.

A wireless local area network (WLAN) links wireless network devices up to a few hundred yards in distance, which makes WLANS useful for mobile network access in office buildings, warehouses, hospitals, and campuses. WLANs utilize RF signals or light signals to connect mobile devices to each other or to a centralized controller and transmit data between the physical devices. In 1997 the IEEE published standards for WLANs under the title of 802.11. The 802.11 standards contain different protocols that may use unlicenced 2.4 GHz and 5 GHz radio bands to transmit packet data. IEEE 802.11 enables mobile stations (e.g., endpoints) to communicate through a wireless network interface card directly with each other or with other stations through an access point. An access point is a centralized gateway providing message and power management and access to an external LAN and/or the Internet. IEEE 802.11 access products are sold with personal computers (e.g., wireless NICs), computer peripherals, print servers, and mobile devices such as laptops and personal digital assistants (PDAs).

There are a plurality of 802.11 standards that each use different frequency bands and have varying data transmission speeds. The original IEEE 802.11 standard supported wireless interfaces operating at speeds of up to 2 megabyte per second (Mbps) in the 2.4 GHz radio band. By using different modulation techniques, IEEE 802.11b raised the data transmission rates to 11 Mbps, while 802.11a supports up to 54

Mbps transmission rates at a 5 GHz frequency. The IEEE 802.11g is developing standards for data transmission rates of 54 Mbps at the 2.4 GHz frequency.

FIG. 2 illustrates a schematic diagram of an 802.11 enterprise network 22 that may be used to implement a wireless telephone system. An IP PBX switch 24 serves as a centralized gateway for processing voice calls placed through the network. Two wireless access points 26 (and 26') are connected to an internal corporate Intranet 40, which is connected to IP PBX 24. The Internet 38 may be accessed through APs 26 and 26', through intranet 40, and through IP PBX 24. Each AP 26 has a range of RF broadcast signals 28 represented by area 30. A wireless mobile telephone 32 can transmit and receive digital voice signals 34 through one or more APs 26 to the IP PBX 24. A wireless telephone 32 can place calls through the IP PBX switch 24 to the PSTN 40 or the call may be routed through the Internet 38, or other type of LAN, to a remote receiver. Multiple APs 26, 26' provide an enterprise wide footprint that can be accessed by a wireless handset 32, depending upon natural signal attenuation of a broadcast signal and intereferences. An enterprise network typically has multiple APs distributed throughout an office or between multiple buildings so that the handset may be operated nearly anywhere in the network broadcast area 30. Therefore, a wireless handset can operate/function within an office with multiple APs or between APs in multiple office buildings with seamless handoffs between the different APs in the same network. Since the 802.11 network is traditionally a data network, a wireless endpoint, such as laptop computer 36, may access the Internet 38 through an AP 26'. In such a configuration, an enterprise 802.11 data network 22 is leveraged for VoIP calls and wireless data access by a wireless endpoint such as mobile phones or wireless network interface card in a computer 36.

The diagram in FIG. 3 illustrates the general assumption that an 802.11 wireless home network rarely has more than one AP 44 per household. AP 44 connects to router 53, which connects to either Internet 38 or connects to PSTN 40 through gateway 52. In a home network 42, RF broadcast signal area 46 is typically adequate from a single AP 44 unless a larger area of coverage is desired. In such a case, extender technology may be used to expand coverage, but using an expander would be the exceptional case. A wireless handset 48 sends voice signals 50 to an AP 44 that is networked into VOIP gateway 52. The VOIP gateway 52 sends voice signals to either the Internet 38 or to the PSTN 40. Laptop computer 54 may also connect to the Internet 38 through AP 44.

Many retail locations, airports, and coffee shops throughout the United States now provide "hotspot" wireless networks. FIG. 4 illustrates a hotspot network 56 with RF signal coverage area 58. Hotspots are typically 802.11 WLAN carriers that may be accessed through a wireless endpoint 60 that connects to an AP 62. The user is authenticated through an authentication server 63, such as a RADIUS server, in order to access Internet 38 through a subscription with an Internet service provider.

Conventional solutions to wireless voice networks include a single telephone that can theoretically roam between both an 802.11 WLAN network and a cellular network the two networks to place and receive calls, and a handset can detect when the user is within range of a signal from either network, with one network preferred over another depending on user preferences. Providing seamless roaming between a wireless LAN using VOIP protocols and a cellular network (e.g., to move from a wireless LAN network signal using IP protocols to a cellular network signal), however, creates complicated technical issues. Complex internetworking challenges between cellular and wireless LAN protocols have to be resolved. Further, cellular telephone network standards may have to be modified as well. The result is that the handset disconnects from a current network and must re-route a call to a completely different network with different protocols and different call setup procedures. Cellular network service providers will most likely be reluctant to embrace a system that disconnects from their cellular networks to place and receive calls, resulting in loss of revenue. The decision tree to determine when such a handoff or roam should occur, the need for interoperability between different cellular carriers and LAN-based networks, combined with irritation to a user who wishes to maintain a call in progress, are all problems with such a system.

SUMMARY

The present invention overcomes the limitations of conventional cellular and wireless IP phones by offering a dual mode telephone that supports multiple protocols without needing seamless roaming between different networks and different network carriers. While the conventional approach to a wireless IP phone with multiple network capabilities is to roam between multiple networks, the present invention maintains connectivity by maintaining separate channels to all available networks simultaneously. A user may choose which network to use for outgoing calls, for example cellular network or a VOIP call on an 802.11 enterprise network. The exemplary mobile phone can terminate VOIP or cellular calls depending on the availability of each respective network's RF signal coverage area.

The exemplary mobile phone can automatically sense when the user is located in a particular network broadcast signal area and perform call setup operations for each type of network. When the mobile phone enters a wireless LAN coverage area at the user's home, the mobile phone assumes the functionality of a home cordless telephone, able to send and receive calls with the user's home telephone number. When the mobile phone is located within wireless IP PBX coverage area at a user's place of work or business, the mobile phone assumes the functionality of a wireless PBX telephone and is able to handle calls to and from the work phone number associated with the IP PBX. Additionally, when the mobile telephone is located within a hotspot broadcast coverage area, the exemplary mobile phone can provide call service through the Internet using national VOIP carriers.

If the mobile phone geographically moves out of a VOIP wireless LAN coverage area or IP PBX coverage area, the user may still make and receive calls using a conventional cellular service provider. Further, when multiple coverage areas are available, such as when a mobile phone is located within an 802.11 coverage area and cellular network area, the mobile phone is capable of making or receiving calls from both networks. If a user is within a cellular coverage area while also within a wireless LAN or IP PBX coverage area, then the phone automatically acquires the capabilities for making an receiving calls on all available networks. When a user travels outside of a wireless LAN or IP PBX coverage area but remains within a cellular coverage area, the mobile phone senses that the only network available is the cellular network and automatically assumes the functionality of a cellular phone to handle calls through a cellular service provider.

Advantages to the multi-function telephone include there is no need to resolve complex protocol internetworking that is problematic when attempting to handoff a wireless call from a cellular carrier to a VOIP wireless network, and vice-versa.

The present invention does not require modification of VOIP network protocols or cellular network protocols. The mobile phone operates within existing protocols on both type of networks and can be upgraded to reflect new or changed protocols. The cellular telephone identity of the present invention is always operational and ready to send and receive cellular-type calls regardless of whether the mobile phone is in a wireless LAN broadcast coverage area. The same mobile phone can provide wireless telephone services as a user's home, work, and cellular network area.

BRIEF DESCRIPTION OF THE DRAWINGS

Preferred embodiments of the invention are discussed hereinafter in reference to the drawings, in which:

FIG. 9 illustrates a functional diagram the mobile phone in an overlapping cellular and ITU 802.11 network.

DETAILED DESCRIPTION OF PREFERRED EMBODIMENTS

Figure 1:
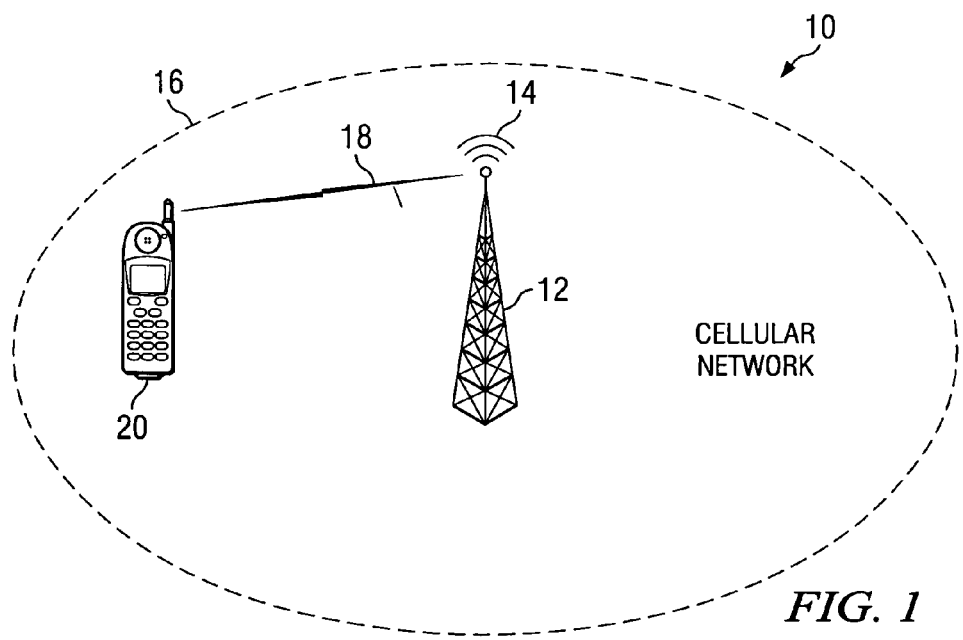
FIG. 1 illustrates a schematic diagram of a cellular telephone network.
Figure 2:
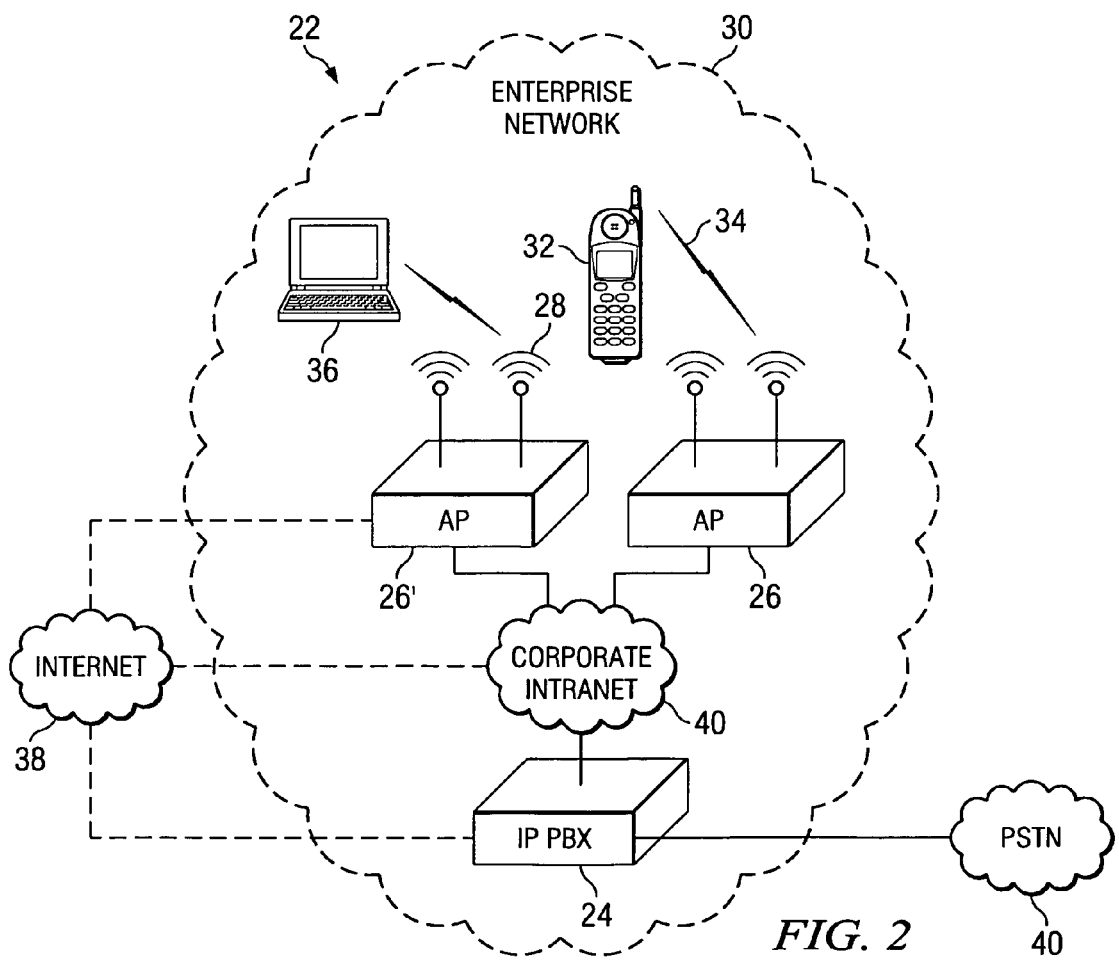
FIG. 2 illustrates a schematic diagram of an enterprise wireless network.
Figure 3:
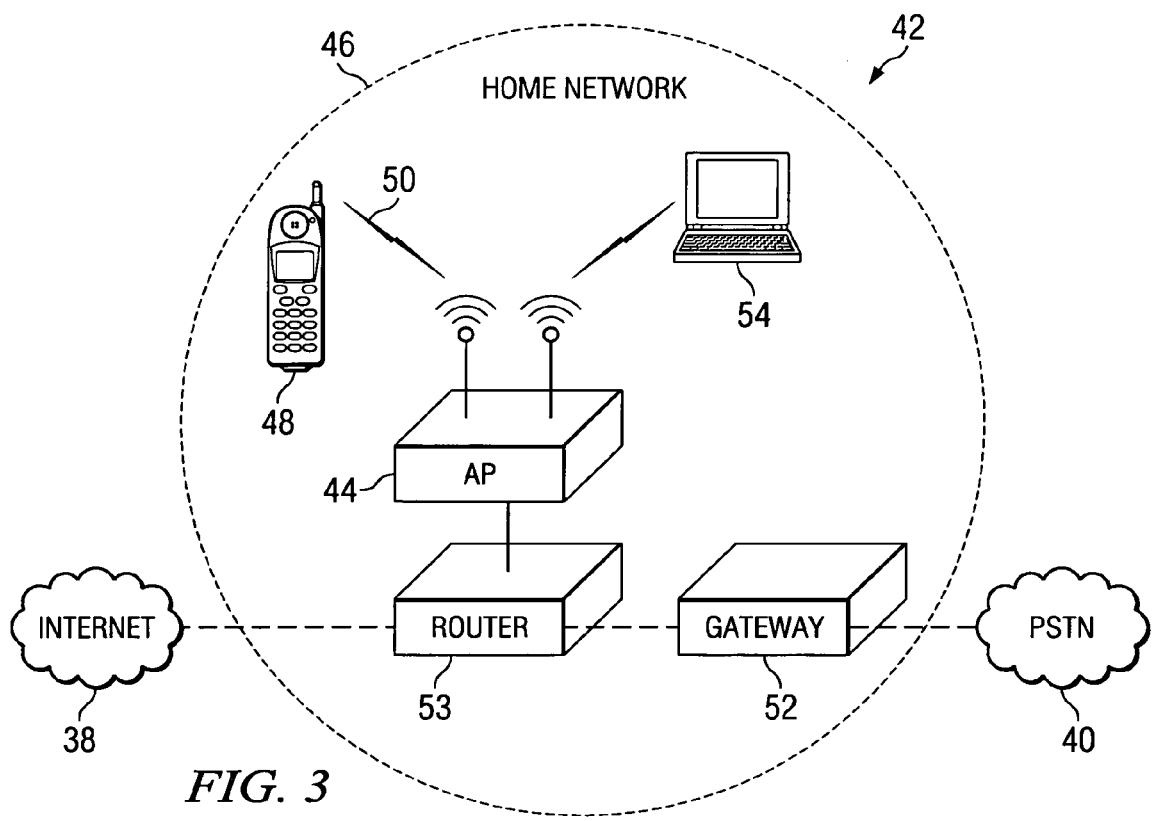
FIG. 3 illustrates a schematic diagram of a wireless home network.
Figure 4:
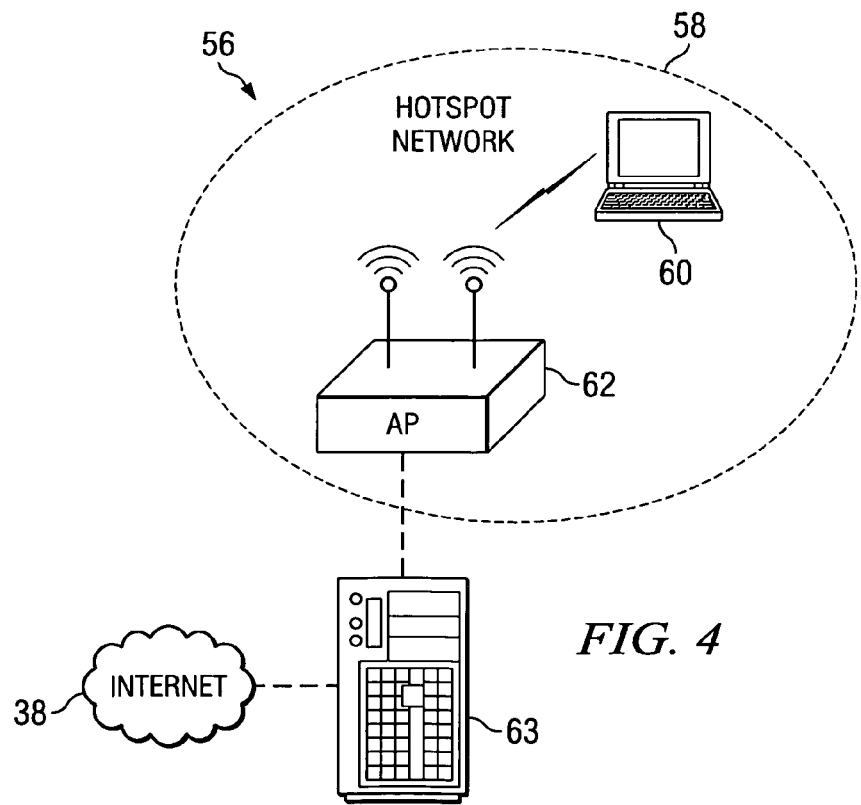
FIG. 4 illustrates a schematic diagram of a hotspot network.
Figure 5:
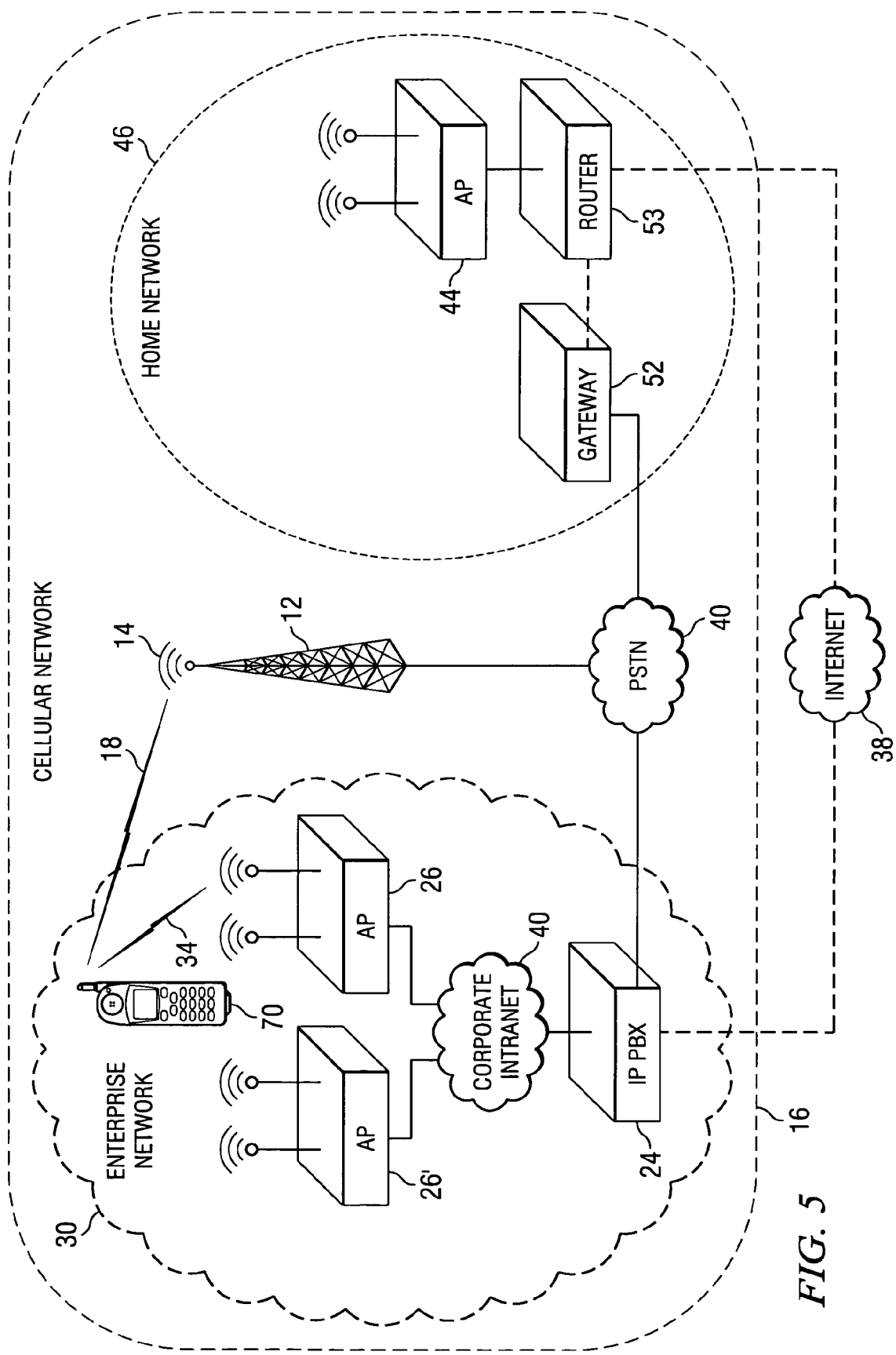
FIG. 5 illustrates a schematic diagram of the mobile phone in an enterprise and cellular network environment.

FIG. 5 is a schematic diagram of the mobile telephone 70 of the preferred exemplary embodiment operating within a multi-network environment. The mobile telephone 70 connects simultaneously to wireless enterprise network 22 or wireless home network 42 and cellular telephone network 10, depending on the location of the phone and coverage area of each network, and is configured to handle calls through either the cellular network 10 or a wireless network simultaneously. Each network transmits voice signals using separate protocols for each distinctive network, for example voice over Internet protocols (VOIP) for packet-based IP enterprise network 22 and home network 42 and appropriate codecs for cellular telephone networks such as global services for mobile communications (GSM) protocols.

Mobile phone 70 is a universal wireless handset containing a cellular operation mode that can route calls under cellular protocols and a VOIP mode that can route calls under VOIP protocols. In FIG. 5, mobile phone 70 is located within cellular telephone network 10. Base station tower 12 broadcasts and receives RF signals 14 up to broadcast area 16. RF signals 14 include downlink and uplink voice channels, such as channel 18 that is received by mobile phone 70. In this mode, mobile phone 70 operates as a traditional cellular telephone.

Mobile phone 70 is also located within enterprise network 22. An enterprise network typically is employed by a large commercial office, industrial complex, or academic facility. Enterprise network 22 is an IEEE 802.11 wireless local area network (WLAN) network. For implementing voice capability, a wireless LAN may use multiple access points and multiple access technologies (e.g., 802.11 a/g) to minimize interference and increase capacity and coverage. An enterprise 802.11 network 22 is leveraged for VOIP: the network comprises multiple APs that provide an enterprise wide footprint. The exemplary handset can "roam" between APs, allowing a user to move freely within the network coverage area. While "roaming" is defined as the ability for a cellular phone customer to automatically make and receive calls when the cellular handset has geographically moved outside of a service provider's home network coverage area and use an alternate network operated by a different service provider, "roaming" between APs refers to a same concept to move the exemplary IP phone between different APs on the same or alternate networks. Enterprise-wide mobility allows affordable mobile connectivity to a large population of employees and can provide enterprise IP-PBX features on a mobile phone such as voice mail, conferencing, transfer, and extension dialing. No additional hardware or software is necessary other than the mobile phone if the enterprise has an 802.11 enabled VOIP capability.

In enterprise network 22, access points (APs) 26 and 26' broadcast RF signals up to the limits of broadcast area 30. Access points 26, 26' are networked to a personal branch exchange (PBX) switch that uses IP protocols to place a voice call either through the public system telephone network (PSTN) 40 or over the Internet 38. An enterprise network typically has a plurality of APs distributed throughout one or more floors of an office building or between office buildings in a complex. Mobile phone 70 connects to an access point 26 on the wireless network over an RF channel 34 that is transmitted using 802.11 protocols. Calls placed and received from mobile phone 70 through IP PBX 24 are routed through either the Internet 38 or other network or may be routed directly to the PSTN 40 depending on the type of call and configuration of IP PBX 24. The routing of calls out of enterprise network 22 is controlled by IP PBX 24, however, calls placed using VOIP would be routed to a remote VOIP gateway or telephone over a packet network, such as Internet 38.

The mobile phone 70 provides simultaneous connectivity to a cellular 10 and a VOIP 802.11 wireless network. Hardware/software within the phone 70 automatically senses when a specific network is within transmission range and sets up the phone appropriately for the specific network thereby preparing the phone for use without user interaction. The mobile phone 70 can accept and place multiple calls using multiple channels over different wireless network systems simultaneously without traditional roaming between networks using a single uplink channel. In this mode, complex network interoperation and signaling that would otherwise be necessary to "roam" between cellular and an 802.11 network are avoided. Conventional roaming is the ability for a cellular customer to automatically make and receive calls when the cellular handset has geographically moved outside of a service provider's home network coverage area and uses an alternate network operated by a different service provider. Here, roaming includes the ability to move seamlessly between different types of networks (e.g., 802.11 hifi and cellular networks). The capability of placing a voice call with a specific protocol using a certain network is independent of one another. In the exemplary embodiment, the mobile phone 70 not only distinguishes between a VOIP call over an 802.11 network and a voice call over a cellular network but also provides simultaneous connectivity to cellular and 802.11 networks using separate channels and hardware/software that recognizes the difference between call procedures for an enterprise business network 22, public cellular network 10, and home network 42.

The exemplary mobile phone serves as a VOIP wireless LAN phone if cellular telephone service is unavailable or the signal is degraded by high interference. Conversely, the mobile phone serves as a traditional cellular wireless phone if a VOIP wireless LAN is unavailable. However, the exemplary mobile phone can stay connected to a cellular network if a user chooses and as long as a signal of sufficient strength is received by the phone from the cellular BTS. When more than one type of network is available such as in an 802.11 area and cellular network area, the mobile phone may stay connected to both networks and allow the user to select the network in which an outgoing call is placed.

When a user carrying mobile telephone 70 is located in a strictly cellular network coverage area 16, only calls using the user's cellular network service are possible. The cellular network service configured to phone 70 may be any of the commercial cellular or PCS services available in the marketplace. When mobile phone 70 is located within range of enterprise network RF coverage area 30 but also within cellular RF coverage area 16, it is capable of performing call VOIP setup procedures using, for example, Session Initiation Protocol (SIP), H.323 or ITU G.711 protocols, and sending the call over RF channel 34 through IP PBX 24 and simultaneously transmitting and receiving cellular calls through tower 12 over cellular channel 18. The mobile phone 70 is may stay connected to both networks, unless the signal is out of range and too weak to receive, so that calls from either network system can be placed and received by using a switching feature on the mobile phone 70. Further, the mobile phone 70 recognizes the presence of an enterprise WLAN network, associates/registers with IP PBX 24, and sets up VOIP configurations appropriately. This way, the user may enter 802.11 network 22 at his or her place of business or employment and begin receiving calls from the user's business or work telephone number without disconnecting from the telephone's 70 cellular telephone number.

Figure 6:
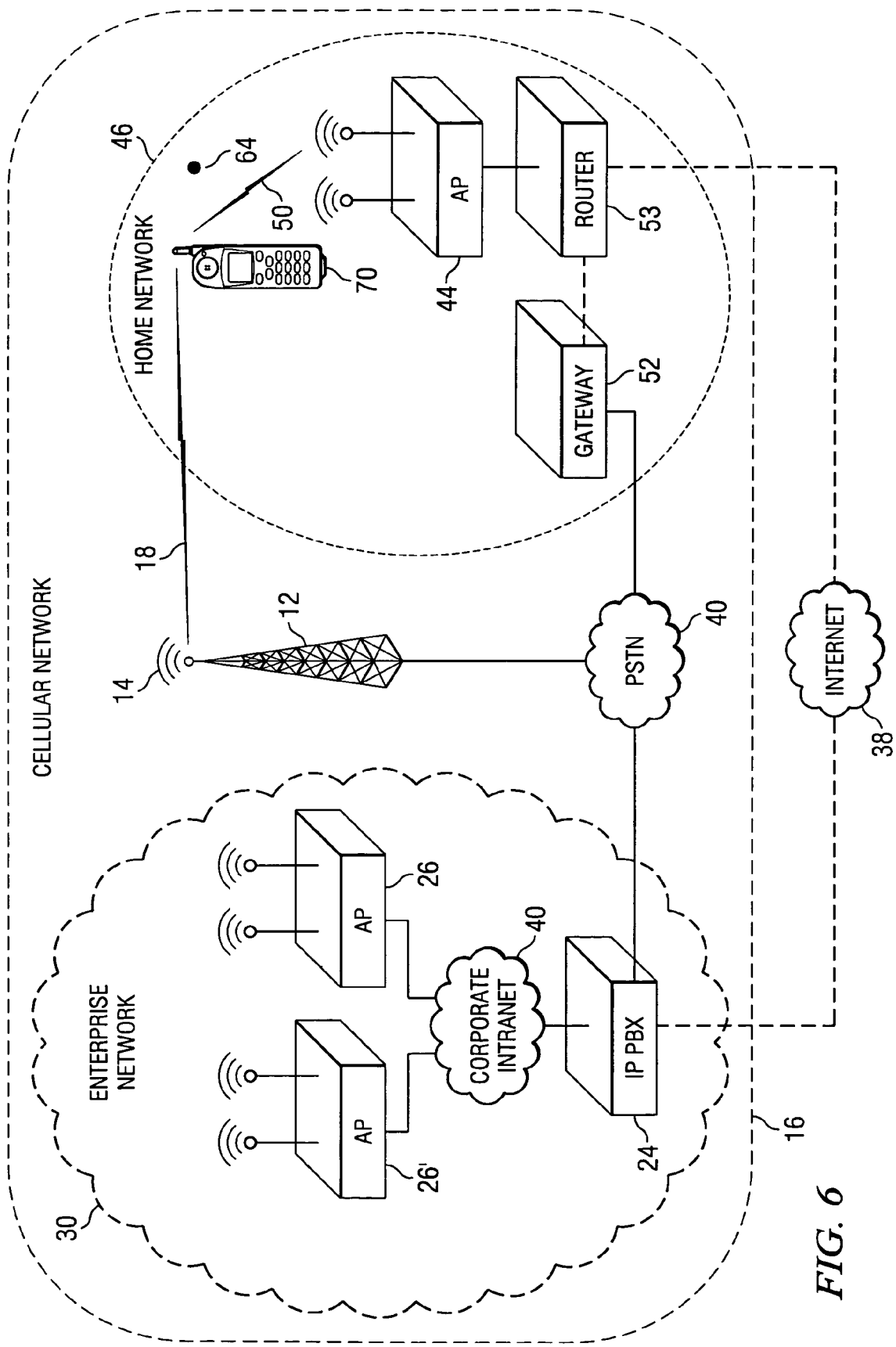
FIG. 6 illustrates a schematic diagram of the mobile phone in a home and cellular network environment.

FIG. 6 illustrates a schematic diagram of the mobile phone 70 moved out of range of enterprise network 22 and into and area that includes both cellular network coverage area 16 and of home network 42 coverage area 46 while maintaining simultaneous service connections. Home network 42 is an 802.11 network with a wireless AP 44 networked to a voice over IP gateway 52. Gateway 52 is connected to the PSTN 40 and/or Internet 38. The mobile phone 70 senses the home network environments and automatically configures dialing and transmission protocols for the home network including IP address and phone numbers recognized by gateway 52. A further user preference may preset which network is used as a default, such as always dial from a wireless LAN in the enterprise 22 or home 42 network when the signal from each respective has sufficient strength.

When a user enters a zone covered by more than one network, the phone senses the user's location and can notify a user's PBX on an enterprise network and home gateway on a home 802.11 network to route calls placed to those numbers to the mobile phone's current location. Routing of calls for cellular networks occurs through a cellular service provider. If calls are received from different networks simultaneously, a user may place one call on hold and answer the second call by performing a call waiting switch on the handset. If the user is engaged in a call that is placed over a cellular network, the user may place the cellular call on hold and answer the rerouted office call received over the 802.11 WLAN system. The remote caller on the cellular channel does not know that the mobile phone user has switched to an entirely different network. The cellular call has simply been placed on hold for later retrieval. No handoffs are performed between voice channels or service providers, therefore multiple calls are placed with minimal routing interaction by cellular or IP service providers.

Because of the auto discovery feature, the mobile phone may simultaneously enter modes as a WLAN phone (e.g., hotspots/802.11x networks), wireless PBX phone (e.g., enterprise network), and a cellular telephone, whenever the phone is moved within range of each respective network. Each mode of the mobile phone can operate with minimal cooperation from an Internet gateway or PBX controller since the control of the voice channels occurs at the handset, not the gateways or ITSPs. The user must enter profiles for the mobile phone that match each different type of network with which the mobile phone 70 will interact. These profiles include setup commands and network-specific parameters. The profiles are saved into memory and may be activated manually by a user upon the phone sensing a new network or automatically by the phone. Upon discovery and auto-configuration of a network parameters, the mobile phone searches internally for the correct profile to match the network. A display on the mobile phone may show a list of all the possible networks that are accessible for placing and receiving calls and the protocols available for sending calls over each of those networks.

Thus, referring again to FIG. 6, when a user moves mobile phone 70 out of enterprise network coverage area 30 moves and into the home network the coverage area 46, the handset will automatically sense and detect the home network broadcast signal from the AP and interface with gateway 52 to send and receive VOIP calls. As long as the phone 70 remains in a signal broadcast areas covered by the cellular network 16 and the home network 46, the telephone can receive calls or place calls over either network. If mobile phone 70 moves out of cellular network coverage area 16 but remains within home network coverage area 46 (e.g., area 64 in FIG. 6), the phone 70 continues to route calls to gateway 52 using 802.11 and VOIP protocols through AP 44.

The exemplary embodiment therefore provides a wireless telephone handset that does not disconnect from a cellular network, senses the presence of an appropriate WLAN network (e.g., 802.11x network) and initiates the process to obtain access to the WLAN network. In this example, the user does not switch between different networks, nor does the mobile phone 70 perform a "handoff" procedure between service providers for a wireless LAN and cellular network. Therefore, the same mobile phone becomes an extension of a wireless IP PBX office phone from a user's workplace when the user is accessing the user's enterprise network or the mobile phone becomes an extension of a home telephone when the user is in the user's home WLAN network coverage area.

Figure 7:
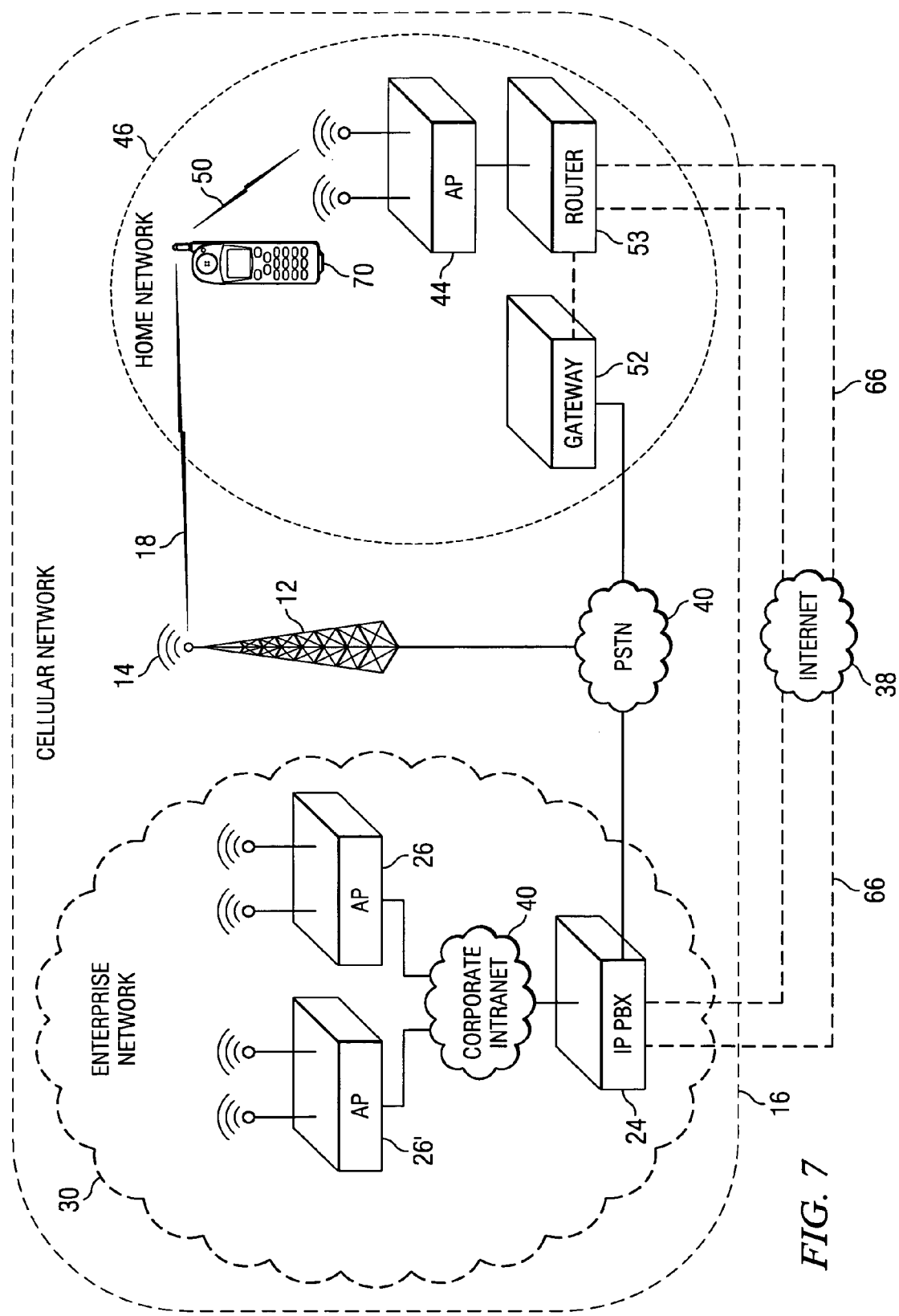
FIG. 7 illustrates a schematic diagram of the mobile phone in a cellular and virtual private network environment.

A virtual private network (VPN) may also be employed to provide connectivity between a home network or remote small office network and a main enterprise network comprising an IP PBX. As a further example of connectivity of the present invention, FIG. 7 illustrates a schematic diagram of mobile phone 70 located home network area 46 and cellular network area 16. Enterprise network 22 is connected to the user's home VOIP gateway 52 through via a virtual private network (VPN) 66 between enterprise network 22 and home network 42. VPN 66 provides IP connectivity through Internet 38 to enterprise network's IP PBX 24. Mobile phone 70 transmits through access point 62 and the call is received through IP PBX 24 at enterprise network 22 allowing a user to access custom PBX features at the user's place of business. Calls received on a work phone number at enterprise network 22 may also be routed from IP PBX 24 to the mobile phone 70 via gateway 52 and AP 44 on the home network 42 without dialing additional numbers, allowing the phone to operate as a seamless extension of a business phone. When the mobile phone 70 is moves from home network area 46 and into the enterprise network area 30, the mobile phone 70 can automatically establish a connection to IP PBX 24 and signal gateway 52 to route home-based calls to IP PBX 24 through the VPN 66, thereby allowing the mobile phone 70 to operate as a home phone extension. Whether connecting over a VPN or standard broadband connection from a home or small office, the mobile handset offers cost savings and flexibility using VOIP through the Internet and keeping a single mobile phone for home, office, and cellular telephone calls.

Figure 8:
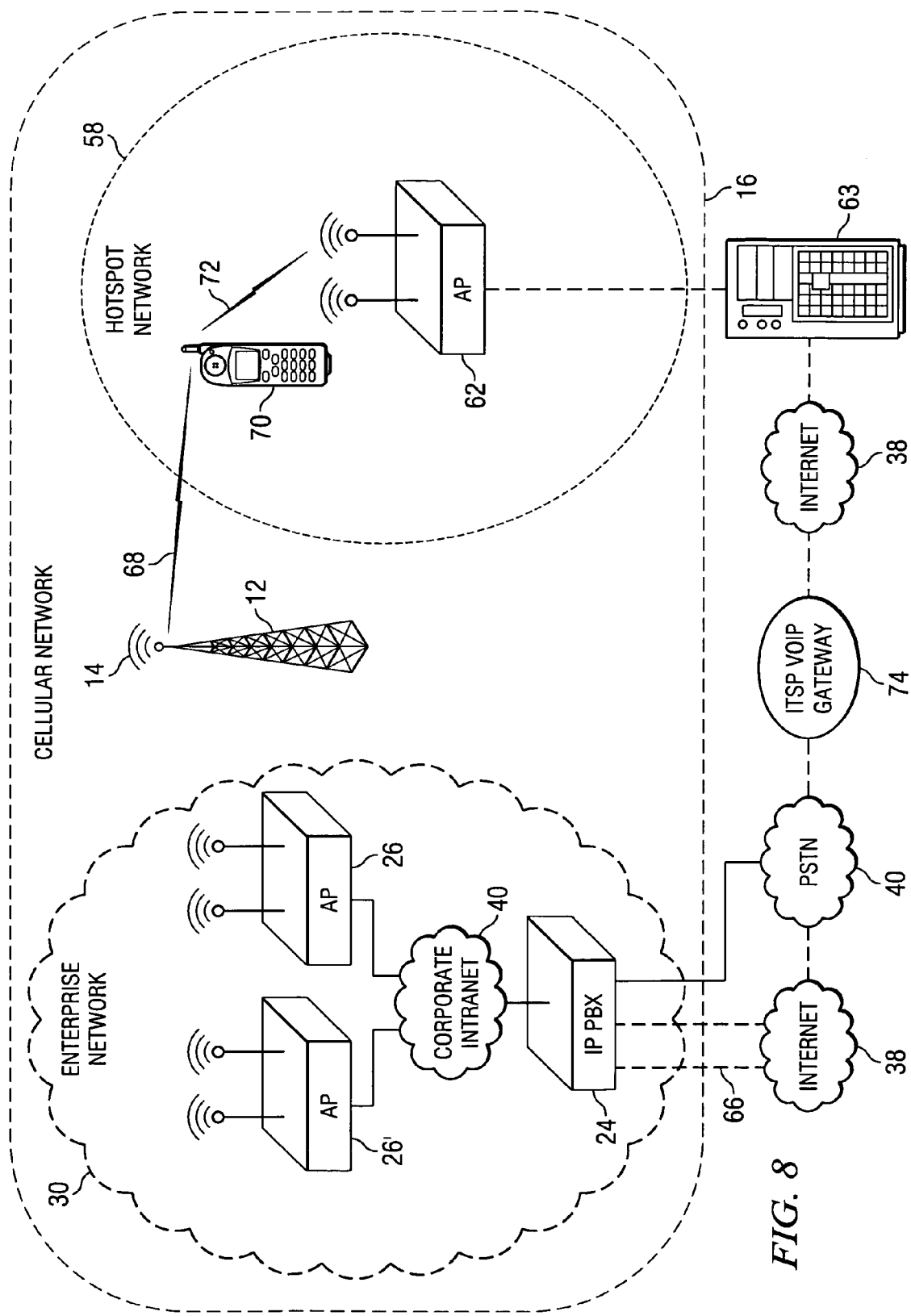
FIG. 8 illustrates a schematic diagram of the mobile phone in hotspot and cellular network environment.

The schematic diagram of FIG. 8 illustrates a "hotspot" network, enterprise network, and cellular network having overlapping RF broadcast coverage areas 58, 30, and 16, respectively. Hotspot network 56 uses 802.11 protocols and broadcasts RF signals from AP 62 over network coverage area 58. AP is connected to the Internet 38 and uses RADIUS server 63 to authenticate users. A remote information technology service provider (ITSP) VOIP gateway 74 is also connected to Internet 38. When mobile telephone 70 enters hotspot broadcast area 58 is auto-senses the AP 62 and connects through Internet 38 to gateway 74 while simultaneously remaining on channel 68 to cellular network 10 if the phone 70 remains within network area 16. Voice packets containing VOIP payloads are automatically transmitted to gateway 74 performing call setup procedures. The gateway provides coding and decoding protocols to transmit voice signals to a remote gateway or to the PSTN 40. A user may set a preference to send and receive all calls, when possible, over the hotspot network, thereby reducing the number of minutes, and expense, spent on a cellular network service provider. By using a national ITSP that carries VOIP calls to the telephone's IP address at hotspot 56, a user can also have all calls forwarded from a home 802.11 network 42 or enterprise network IP PBX 24 to mobile phone 70.

The enterprise network is connected to the user's ITSP VOIP gateway 74 via a virtual private network (VPN) 66. VPN 66 provides IP connectivity through Internet 38 to enterprise network's IP PBX 24.

When the mobile phone automatically senses whether the 802.11 network is a home or business network of the user, software in the mobile phone may load preset profiles. Profiles are preprogrammed by the user, containing configurations for the a home access point and VOIP gateway, PBX and IP PBX for use at an office building, and configurations for public hotspots. Profiles can include the type of VOIP codecs for voice compression and hi or low fidelity settings. The mobile phone 70 can display the type of profile and codec settings currently in use by the mobile or codecs that are available for switching based upon the receiving phone or phone system's capabilities.

When mobile phone is outside of a WLAN network coverage area, the phone searches for available WLANs by sending probe requests and probe responses. When a compatible WLAN is detected, the phone matches the information from the WLAN with one of the stored network profiles. When an WLAN signal is detected, the mobile phone sends an association request to the transmitting AP, and the AP responds back with an association response. Once the response is received, the mobile phone starts an authentication process with the authentication server for the WLAN. As one skilled in the art will know, there are a number of possible authentication processes available for WLAN networks, such as 802.1x, Wi-Fi Protected Access (WPA) or static keys like WEP (Wired Equivalent Privacy). Wi-Fi Protected Access is a specification for a security enhances for data protection/encryption and access control/authentication for WLAN networks. The authentication server is accessible through the AP. An example of an authentication process is the IETF's Extensible Authentication Protocol (EAP) for 802.1x. The authentication exchange is performed between the mobile phone and the authentication server through an authenticator that acts only as a bridge. From the mobile phone to the authenticator, the protocol is defined as EAP over LANs (EAPOL) or EAP over wireless (EAPOW). On the back-end, the protocol used in RADIUS. The 802.1x authentication occurs after association, an AP is the facilitator of the message exchange between an authentication server and the mobile phone.

After registration with an authentication server, the mobile phone registers with a VOIP server on the Internet. Registration with a VOIP server registers the mobile phone's location, using a current IP address or other location data, with the phone's telephone number. This procedure provides the phone's VOIP server with a location of the mobile phone so that the server may direct calls made to the phone's telephone number. For example, when a mobile phone enters a hotspot zone, authenticates through a RADIUS server, and registers with an online VOIP server, the VOIP server associates the mobile phone's IP address at the specific hotspot location with the mobile phone's telephone number so that a user may begin to receive calls at the hotspot location.

FIG. 9 is an exemplary message flow diagram demonstrating a cellular and a VOIP call to the preferred mobile phone. Cellular system 80 of the mobile phone 70 is active when the mobile phone is within range of a cellular network 76. Likewise, WLAN VOIP System 82 of the mobile phone is active when the phone is within range of a WLAN 72, such as an 802.11x network. Gateway 74 is a VOIP gateway used to transmit voice packets through the Internet or other data network. In the example, an incoming cellular call 84 is received by cellular system 80, which executes a normal call setup procedure. Cellular system issues an alert 86 the user 78 with a caller ID and other relevant information that the cellular call 84 is received. User 78 decides to accept the call 88 in a typical fashion, such as pressing a "send" key on the phone's keypad. After the call is accepted, the cellular system 80 sends a notification 90 to the VOIP System 82 of the incoming call acceptance and assumes control of a microphone and speaker on phone 70. The cellular call is then in an active state 92. A similar procedure occurs if the first call received is from the VOIP gateway 74. The VOIP system 82 would receive the call and sends a notification to the cellular system 80 of the incoming call acceptance and assume control of a microphone and speaker.

While cellular call is still active 92, the VOIP system 82 receives an incoming call notification 94 from gateway 74 and executes a normal call setup procedure. VOIP system 82 is aware of the active cellular call 92 and sends an alert 96 to user 78 of a "call waiting from VOIP" instead of a normal incoming call alert. The user decides to accept the VOIP call 98 in a normal fashion, such as pressing a "send" key on the phone's keypad. The VOIP system 82 sends notification 100 to inform cellular system 80 of the accepted VOIP call and then assumes control of the microphone and speaker. The cellular system 80 executes a call hold procedure and places the cellular call on hold 104 while VOIP call is active 102. A similar procedure occurs if the VOIP system 82 is active and receives a cellular call. In such a case, a "call waiting from Cell" message could appear instead of a normal incoming call alert.

During the VOIP call, user 78 presses the equivalent of a "flash" key 106 on mobile phone 70 to switch back to the cellular call, which causes the VOIP system 82 to inform cellular system 80 with a notification 108 and pass control of the microphone and speaker to cellular system 80. VOIP system 82 then executes a call hold procedure and places the VOIP call on hold 110. The cellular system 80 executes a procedure to "unhold" 112 the cellular call. Afterwards, user 78 completes the cellular call and hangs up 114. The cellular system executes a call release scenario 116 and informs the VOIP system with a hang up notification 118. Upon notification 118, VOIP system 82 assumes control of the microphone and speaker in the phone 70 and rings the phone again 120. This process is similar to how the PSTN handles call waiting. In a traditional phone, if a user hangs up one line while a second line that was placed on call waiting is still active, the phone will ring to notify the user that the waited call is still on hold.

User 78 presses a "send" key and notification 124 is sent to VOIP system 82 to switch to the VOIP call, upon which the VOIP system executes a procedure to unhold 126 the VOIP call and make the call active. The user then hangs up the VOIP call 128 and the VOIP system 82 executes a call release procedure 130 to gateway 74. The VOIP system 82 then informs cellular system 80 with a hang up notification 132 and places the speaker and microphone into an idle state.

The exemplary sequence will be similar regardless of whether the cellular system 80 or the VOIP system 82 receives the first incoming call. A call waiting procedure is used in either scenario, when one call is cellular and one call is VOIP. Further, the procedure is comparable if both of the incoming calls are cellular or both incoming calls are VOIP. If the mobile phone 70 already has two active calls (e.g., one active VOIP call and one active cellular call), and a third incoming call is received by either system, the system handling the new incoming call will execute a procedure as if the user did not want to answer an incoming "call waiting" call.

The exemplary mobile phone benefits cellular carriers by fully leveraging cellular telephone network coverage and mobility. Rate of use will increase because a user is more likely to keep the mobile phone with him or her at all times since the phone acts as an extension of a home phone and an office phone. The user will also be less likely to turn the phone off when at home if the mobile phone also acts as the dedicated home telephone. Further, there are no infrastructure changes and capital investments in software programming needed in the various networks since the VOIP over 802.11 and cellular network hardware and software is contained within the mobile phone's handset.

As one skilled in the art will recognize, the different networks used with mobile phone 70 are not exclusive for the present invention. For example, an enterprise network containing a wireless PBX telephone system may use different connectivity protocols than 802.11, and home or hotspot network may use different IP protocols, such as Bluetooth®. While conventional telephones disconnect from networks or attempt handoffs between networks as they move into and out of overlapping wireless network coverage areas, the exemplary telephone overlaps all of the wireless networks that are available and can indicate to a user the type of wireless network and strength of a signal from each network. The user may then select one network to send a call but receive a call simultaneously through a different network, depending on which network signals are available, all without obtaining approval from a third party service provider.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A mobile phone for connecting to multiple wireless networks said mobile phone is located in an overlapping cellular network and wireless local area network (WLAN), said mobile phone comprising:
   a cellular module for handling a call through said cellular network said cellular module detects said cellular network and loads a cellular module profile to configure said mobile phone to send and receive calls on said cellular network;
   a wireless network module, operably connected to said cellular module, for handling a call through said wireless local area network (WLAN), wherein said cellular module and said wireless network module transmit simultaneously, said wireless network module scans for WLAN signals and matches WLAN parameters with a stored profile that configures said mobile phone to access said WLAN using an authorization procedure that is active on said WLAN and registers said mobile phone with a gateway on a network connected to said WLAN; and
   said mobile phone detects a WLAN access point and loads an operating WLAN profile for said wireless network module that configures said mobile phone to site-specific WLAN network parameters, wherein said mobile phone is capable of making or receiving calls from both networks, wherein, when said phone receives both said cellular network call and said WLAN call, said phone may switch between the two calls using a call waiting procedure.

2. The mobile phone of claim 1, wherein said profile comprises at least one of a plurality of parameters saved into a memory of said mobile phone of voice compression protocols and Internet Protocol network addresses.

3. The mobile phone of claim 1, wherein said profile is one of a plurality of profiles which comprise configuration parameters for a plurality of wireless networks comprising a plurality of wireless network locations.

4. The mobile phone of claim 1, wherein said cellular module handles said calls using cellular network protocols, and
   said wireless network module handles said calls on said WLAN using voice over Internet protocols.

5. The mobile phone of claim 1, wherein, when the mobile phone enters a home WLAN, said wireless network module senses said home WLAN, loads a profile specific to said home WLAN which configures said mobile phone for sending and receiving calls using a home telephone number.

6. The mobile phone of claim 1, wherein the wireless network module senses broadcast signals from a plurality of different WLANs and loads one of a plurality of said profiles to configure voice over Internet Protocols for said mobile telephone that are pre-configured for each said WLAN.

7. A mobile phone for connecting to multiple wireless networks said mobile phone, having a phone number, is located in an overlapping cellular network and wireless local area network (WLAN), said mobile phone comprising:
   a cellular module for handling a call through said cellular network said cellular module detects said cellular network and loads a cellular module profile to configure said mobile phone to send and receive calls on said cellular network;

a wireless network module, operably connected to said cellular module, for handling a call through said wireless local area network (WLAN), wherein said cellular module and said wireless network module transmit simultaneously, said wireless network module scans for WLAN signals and matches WLAN parameters with a stored profile that configures said mobile phone to access said WLAN using an authorization procedure that is active on said WLAN and registers said mobile phone with a gateway on a network connected to said WLAN; and said mobile phone detects a WLAN access point and loads an operating WLAN profile for said wireless network module that configures said mobile phone to site-specific WLAN network parameters, wherein said mobile phone is capable of making or receiving calls from both networks, wherein, when said mobile phone enters a broadcast area of a wireless private branch exchange (PBX) network, said wireless network module senses said wireless PBX and loads a profile specific to said wireless PBX which enables said mobile phone to send and receive calls using a telephone number associated with said wireless PBX.

8. A mobile phone for connecting to multiple wireless networks said mobile phone, having a phone number, is located in an overlapping cellular network and wireless local area network (WLAN), said mobile phone comprising:

a cellular module for handling a call through said cellular network said cellular module detects said cellular network and loads a cellular module profile to configure said mobile phone to send and receive calls on said cellular network;

a wireless network module, operably connected to said cellular module, for handling a call through said wireless local area network (WLAN), wherein said cellular module and said wireless network module transmit simultaneously, said wireless network module scans for WLAN signals and matches WLAN parameters with a stored profile that configures said mobile phone to access said WLAN using an authorization procedure that is active on said WLAN and registers said mobile phone with a gateway on a network connected to said WLAN; and said mobile phone detects a WLAN access point and loads an operating WLAN profile for said wireless network module that configures said mobile phone to site-specific WLAN network parameters, wherein said mobile phone is capable of making or receiving calls from both networks, wherein, when said operating profile is loaded into said wireless network module, said wireless network module matches a network address from said profile with said WLAN, allowing said mobile phone to transmit said call using said phone number through said WLAN.

9. A mobile phone for connecting to multiple wireless networks said mobile phone, having a phone number, is located in an overlapping cellular network and wireless local area network (WLAN), said mobile phone comprising:

a cellular module for handling a call through said cellular network said cellular module detects said cellular network and loads a cellular module profile to configure said mobile phone to send and receive calls on said cellular network;

a wireless network module, operably connected to said cellular module, for handling a call through said wireless local area network (WLAN), wherein said cellular module and said wireless network module transmit simultaneously, said wireless network module scans for WLAN signals and matches WLAN parameters with a stored profile that configures said mobile phone to access said WLAN using an authorization procedure that is active on said WLAN and registers said mobile phone with a gateway on a network connected to said WLAN; and said mobile phone detects a WLAN access point and loads an operating WLAN profile for said wireless network module that configures said mobile phone to site-specific WLAN network parameters, wherein said mobile phone is capable of making or receiving calls from both networks, wherein, when said mobile phone enters a hotspot network broadcast area, said wireless network module senses said hotspot network and loads one of a plurality of said profiles to configure said mobile telephone to send and receive calls through said hotspot network using appropriate voice over Internet protocols.

10. A mobile phone for connecting to multiple wireless networks, comprising:

a cellular system that routes calls under cellular protocols;

a wireless network system, operably connected to said cellular system, that routes calls under voice over Internet protocol (VOIP) protocols through a wireless local area network (WLAN); and a memory system, operably connected to said wireless network system, for saving a plurality of profiles network configuration parameters for said mobile phone that match each different type of said WLAN with which said mobile phone interacts, wherein said cellular system and said wireless network system are configured to route calls simultaneously, and said mobile phone detects a specific WLAN and loads at least one of said profiles matching said specific WLAN, when said mobile phone enters a broadcast area of a wireless private branch exchange (PBX) network, said wireless network module senses said wireless PBX and loads a profile specific to said wireless PBX which enables said mobile phone to send and receive calls using a telephone number associated with said wireless PBX, when the mobile phone enters a home WLAN, said wireless network module senses said home WLAN, loads a profile specific to said home WLAN which configures said mobile phone for sending and receiving calls using a home telephone number, and, wherein said phone is capable of making or receiving calls from any of said multiple networks, wherein, when one of said profiles loads into said wireless network system, said wireless network system matches a network address from said profile with said WLAN, allowing said mobile telephone to route calls through said WLAN.

11. The mobile phone of claim 10, wherein each of said profiles comprises at least one of a plurality of parameters saved into a memory of said mobile phone of voice compression protocols and Internet Protocol network addresses.

12. The mobile phone of claim 10, wherein, when said mobile phone enters a broadcast area of a wireless private branch exchange (PBX) network, said wireless network system detects said wireless PBX and loads one of said profiles specific to said wireless PBX which enables said mobile phone to send and receive calls using a telephone number associated with said wireless PBX.

13. The mobile phone of claim 10, wherein said mobile phone cannot handoff a call between said cellular network and said WLAN.

14. The mobile phone of claim 10, wherein, when said mobile phone is located in an overlapping cellular network and WLAN area, said cellular system detects said cellular network and loads a cellular system profile to configure said mobile phone to send and receive calls on said cellular network, and said wireless network system scans for WLAN signals and matches WLAN parameters with a stored profile that configures said mobile phone to access said WLAN using an authorization procedure that is active on said WLAN and registers said mobile telephone with a gateway on a network connected to said WLAN.

15. A mobile phone for connecting to multiple wireless networks said mobile phone is located in an overlapping cellular network and wireless local area network (WLAN), said mobile phone comprising:

a cellular module for handling a call through said cellular network;

a wireless network module, operably connected to said cellular module, for handling a call through said wireless local area network (WLAN), wherein said cellular module and said wireless network module transmit simultaneously; and said mobile phone detects a WLAN access point and loads an operating WLAN profile for said wireless network module that configures said mobile phone to site-specific WLAN network parameters, when said mobile phone enters a broadcast area of a wireless private branch exchange (PBX) network, said wireless network module senses said wireless PBX and loads a profile specific to said wireless PBX which enables said mobile phone to send and receive calls using a telephone number associated with said wireless PBX, when the mobile phone enters a WLAN, said wireless network module senses said WLAN, loads a profile specific to said WLAN which configures said mobile phone for sending and receiving calls using a telephone number associated with said wireless WLAN, when said phone receives calls from at least two networks, said phone may switch between the two calls using a call waiting procedure.

16. A mobile phone for connecting to at least a cellular network and a wireless network, comprising:

a cellular system that routes calls under cellular protocols, said cellular system detects said cellular network and loads a cellular profile to configure said mobile phone to send and receive calls on said cellular network;

a wireless network system, operably connected to said cellular system, that routes calls under voice over Internet protocol (VOIP) protocols through a wireless network;

a memory system, operably connected to said wireless network system, for saving a plurality of profiles network configuration parameters for said mobile phone that match each different type of said wireless network with which said mobile phone interacts, wherein said cellular system and said wireless network system are configured to route calls simultaneously;

said mobile phone detects a specific wireless network and loads at least one of said profiles matching said specific wireless network, wherein, when said phone is located in an overlapping cellular network and wireless network, and said wireless network module scans for wireless network signals and matches wireless network parameters with a stored profile that configures said mobile phone to access said wireless network using an authorization procedure that is active on said wireless network and registers said mobile telephone with a gateway on a network connected to said wireless network, wherein said mobile phone is capable of making or receiving calls from both networks and when said phone receives calls from at least two networks, said phone may switch between the two calls using a call waiting procedure.

* * * * *